(12) United States Patent
Garden

(10) Patent No.: US 6,352,608 B1
(45) Date of Patent: Mar. 5, 2002

(54) BUSINESS FORM

(76) Inventor: Ronald L. Garden, P.O. Box 6164, Carefree, AZ (US) 85377

(*) Notice: Subject to any disclaimer, the term of this patent is extended or adjusted under 35 U.S.C. 154(b) by 0 days.

(21) Appl. No.: 09/390,443

(22) Filed: Sep. 7, 1999

(51) Int. Cl.⁷ .............................. B32B 7/06; B32B 7/12; B42D 15/00
(52) U.S. Cl. ...................... 156/249; 156/247; 156/289; 156/277; 428/41.8; 428/42.2; 428/42.3; 428/195; 283/81; 283/94; 283/101
(58) Field of Search ................................. 156/247, 248, 156/249, 250, 252, 253, 256, 257, 264, 270, 277; 428/40.1, 41.8, 42.1, 42.2, 42.3, 195; 283/81, 94, 98, 100, 101, 103, 105, 108, 109

(56) References Cited

U.S. PATENT DOCUMENTS

| | | | | |
|---|---|---|---|---|
| 4,846,501 A | * | 7/1989 | Del Grande | |
| 4,907,359 A | * | 3/1990 | Berman | |
| 4,940,258 A | * | 7/1990 | Cube, Jr. et al. | 283/81 |
| 5,104,148 A | * | 4/1992 | Neal | 283/81 |
| 5,267,899 A | * | 12/1993 | Longtin | 283/81 X |
| 5,466,502 A | * | 11/1995 | Wilkinson et al. | 428/195 X |
| 5,482,753 A | * | 1/1996 | Langan et al. | 283/101 X |
| 5,487,568 A | * | 1/1996 | Ipsen | 283/81 |
| 5,597,635 A | * | 1/1997 | Pusl et al. | 428/42.2 |
| 5,601,313 A | * | 2/1997 | Konkol et al. | 283/81 |
| 5,673,943 A | * | 10/1997 | Campbell | 283/81 X |
| 5,833,273 A | * | 11/1998 | Strenk et al. | 283/81 X |

* cited by examiner

Primary Examiner—Curtis Mayes
(74) Attorney, Agent, or Firm—Tod R. Nissle, P.C.

(57) ABSTRACT

A business form is disassembled and manipulated to prepare a plurality of different labels each utilizing a different structure to attach the label to an object. The labels facilitate the correlation of a vehicle and the keys for the vehicle.

4 Claims, 4 Drawing Sheets

BUSINESS FORM

This invention relates to business forms and methods of making the same.

More particularly, the invention relates to a business form which has a common laminate structure throughout the form.

In another respect, the invention relates to a business form of the type described which, even though the form has a common laminate structure throughout, is disassembled and manipulated to prepare a plurality of different labels each utilizing a different structure to attach the label to an object.

In a further respect, the invention relates to a method of using a business form to identify separately an object and a loose article associated with the object.

In still a further respect, the invention relates to a system and method for accurately correlating a vehicle with a key utilized in the vehicle.

A particular problem which occurs at businesses which sell automobiles, pickup trucks, and other vehicles is identifying the ignition key and other keys utilized with each vehicle. This problem is typically solved by attaching each key to a tag. The tag includes information identifying the vehicle with which the key is utilized. The information on the tag can be handwritten, typed, or otherwise formed on the key. This time proven process has been used for many years, but has disadvantages. First, reading the information on the tag can be difficult, especially if the information is handwritten. Second, sorting out key tags for two vehicles which are the same model and color is confusing. It is often a simple matter to take inadvertently the incorrect key.

Another related problem which occurs at automobile and other vehicle dealerships is correlating a key with a particular vehicle. There are, on the lot of an automobile or truck or boat dealership, many similar or identical model vehicles. By the time a sales person takes the key and walks out onto the lot, the sales person may no longer be certain which vehicle on the lot corresponds to the key. For example, even though the sales person knew—when he walked inside to pick up a key for a vehicle—that the vehicle at issue was a white 1999 Ford Model 150 pickup truck with a 500 liter engine, by the time the sales person returns to the lot, he sees an entire row of new or used white 1999 Ford Model 150 pickup trucks each with a 500 liter engine, and he is not certain which truck corresponds to the set of keys in his hand. In order to address this problem, pairs of paper tags have, for many years, been produced. Each pair of tags is attached along a perforated line to facilitate separation of the two tags. A common vehicle identification number is inscribed on each tag. One tag is mounted in a vehicle. The keys to the vehicle are carried on the other tag. The common vehicle identification number is used to match the keys to the vehicle. The tags are made from paper. A disadvantage of this tag system is that the tag carrying the keys tears and must be discarded in a relatively short period of time. Another disadvantage is that writing or printing on the tags smears and can, when placed on a vehicle seat, stain the seat. The paper tags can be replaced with key tags made of hard plastic or metal. Such tags are much more expensive and can not be readily separably joined together. Consequently, vehicle dealerships have ordinarily continued to rely on conventional paper tags which readily "fold, spindle, and mutilate".

Accordingly, it would be highly desirable to provide improved tags to identify and correlate a vehicle with a particular key or other loose article associated with the vehicle.

Therefore, it is a principal object of the invention to provide an improved apparatus and method for preparing simultaneously a label and a tag for use in connection with a selected object and a loose article associated with the use of the selected object.

Still a further object of the instant invention is to provide an improved system for correlating an object and a loose article utilized in connection with the object.

These and other further and more specific objects and advantages of the invention will be apparent to those skilled in the art from the following detailed description thereof, taken in conjunction with the drawings, in which.

Figure 3:
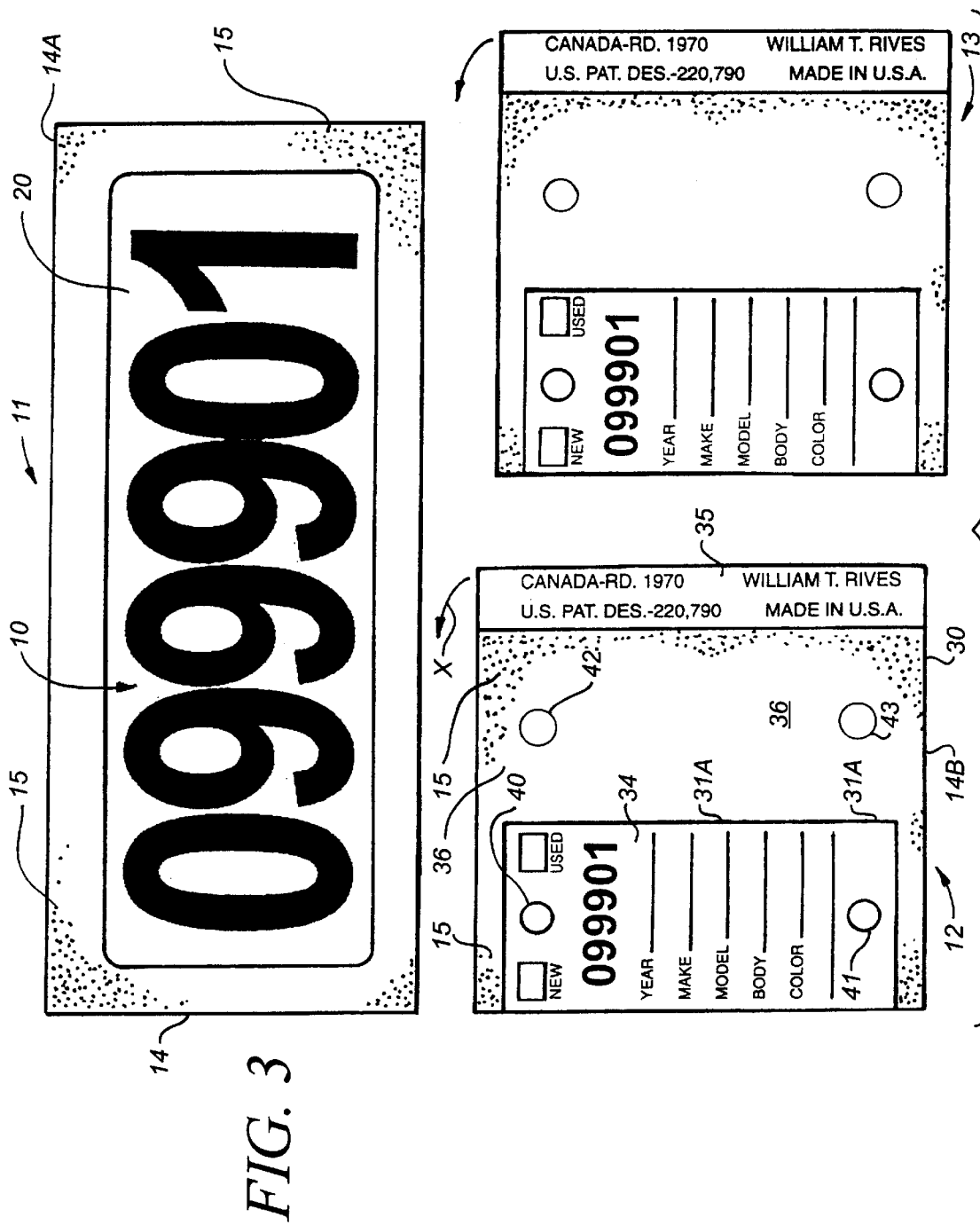
Figure 4:
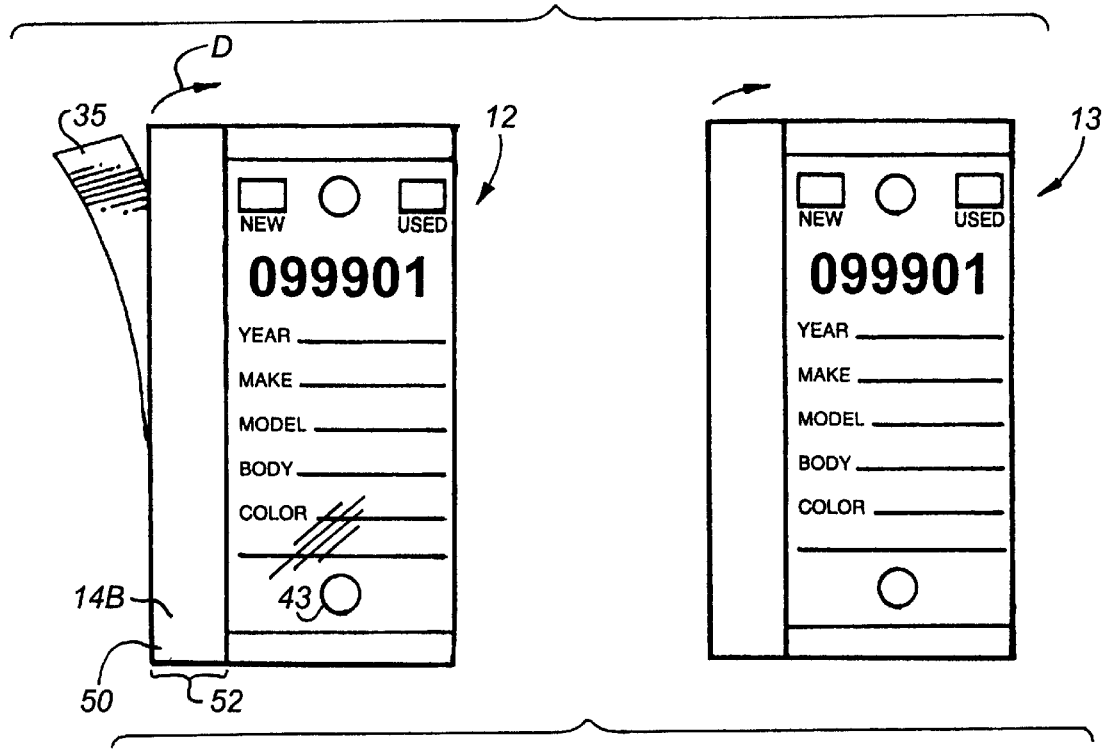
Figure 5:
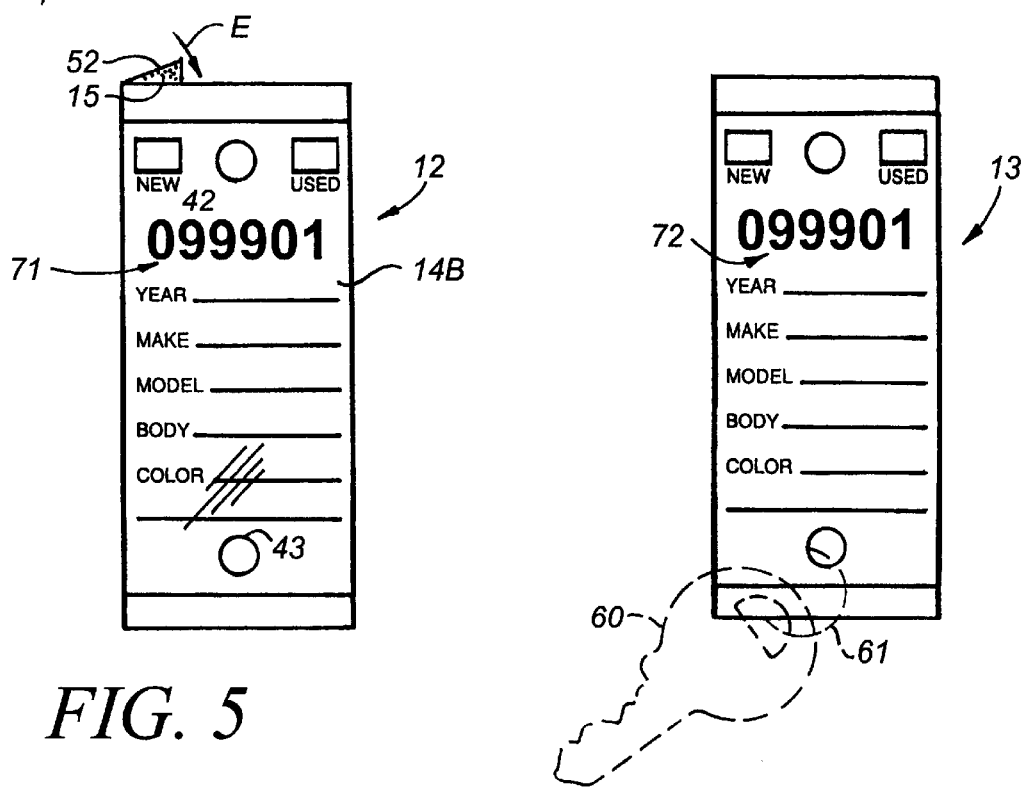

FIG. 3 further illustrates the mode of operation of the business form of the invention; and, FIGS. 4 and 5 further illustrate the mode of operation of the business form utilized in the practice of the invention.

Briefly, in accordance with my invention, I provide an improved business form for disassembly and manipulation to produce a label to be adhesively attached to an object, and to produce a tag to be attached to an article associated with the object such that the article freely moves in at least one direction with respect to the tag. The business form includes a laminate label construction and a laminate tag construction. The laminate label construction includes a first backing sheet; a first layer of adhesive on the backing sheet; and a first layer of material. The first layer of material includes a front surface and a back surface, the back surface of the first layer of material contacting and covering the first layer of adhesive; a first outer peripheral edge; a first die cut area lying within the first outer peripheral edge; a plurality of symbols formed on the front surface of the first layer of material in the first die cut area; and, a first edge portion intermediate the first outer peripheral edge and the first die cut area and releasably attached to a portion of the first layer of adhesive for removal to expose the portion of the first layer of adhesive.

The laminate tag construction is separably attached to the laminate label construction and includes a second backing sheet; a second layer of adhesive on the backing sheet; and, a second layer of material. The second layer of material includes a front surface and a back surface, the back surface of the second layer of material contacting and covering the second layer of adhesive; a second outer peripheral edge; a second die cut area lying within the second outer peripheral edge; a plurality of symbols on the second front surface in the second die cut area and corresponding to the plurality of symbols on the first front surface of the first die cut area; and, a second edge portion intermediate the second outer peripheral edge and the second die cut area and releasably attached to a portion of the second layer of adhesive for removal to expose the portion of the second layer of adhesive such that a portion of the second backing sheet can be folded over the second die cut area such that the portion of the second layer of adhesive contacts the second die cut area and secures the portion of the second backing sheet to the die cut area.

In another embodiment of the invention, I provide an improved method of correlating a key for a vehicle with the vehicle. The vehicle includes a window. The improved method includes the step of providing a business form for disassembly and manipulation to produce a label to be adhesively attached to an object, and to produce a tag to be attached to an article associated with the object such that the article freely moves in at least one direction with respect to the tag. The business form includes a laminate label construction and a laminate tag construction.

The laminate label construction includes a first backing sheet; a first layer of adhesive on the backing sheet; and, a first layer of material. The first layer of material includes a front surface and a back surface, the back surface of the first layer of material contacting and covering the first layer of adhesive; a first outer peripheral edge; a first die cut area lying within the first outer peripheral edge; a plurality of alphanumeric characters formed on the front surface of the first layer of material in the first die cut area; and, a first edge portion intermediate the first outer peripheral edge and the first die cut area and releasably attached to a portion of the first layer of adhesive for removal to expose the portion of the first layer of adhesive.

The laminate tag construction is separably attached to the laminate label form and includes a second backing sheet having a transparent portion; a second layer of adhesive on the backing sheet; and, a second layer of material. The second layer of material includes a front surface and a back surface, the back surface of the second layer of material contacting and covering the second layer of adhesive; a second outer peripheral edge; a second die cut area lying within the second outer peripheral edge; a plurality of alphanumeric characters formed on the second front surface in the second die cut area and corresponding to the plurality of alphanumeric characters on the first front surface of the first die cut area; and, a second edge portion intermediate the second outer peripheral edge and the second die cut area and releasably attached to a portion of the second layer of adhesive for removal to expose the portion of the second layer of adhesive such that a portion of the second backing sheet can be folded over the second die cut area such that the portion of the second layer of adhesive contacts the second die cut area and secures the portion of the second backing sheet to the die cut area.

The method also includes the steps of disassembling and manipulating the business form to produce the label by separating the laminate label construction from the business form and by peeling the first edge portion off the first layer to expose the portion of the first layer of adhesive; pressing the portion of the first layer of adhesive against the window of the vehicle; disassembling and manipulating the business form to produce the tag by separating the laminate tag construction from the business form, by peeling the second edge portion off the second layer to expose the portion of the second layer of adhesive, and by folding the portion of the second backing sheet over the second die cut area to contact the portion of the second layer adhesive with the second die cut area to secure the transparent portion of the second backing sheet to the second die cut area; and, attaching the vehicle key to the laminate tag form.

In a further embodiment of the invention, I provide an improved business form for disassembly and manipulation to produce a label to be adhesively attached to an object, and to produce a tag to be attached to an article associated with the object such that the article freely moves in at least one direction with respect to the tag. The business form includes a laminate label construction and a laminate tag construction. The laminate label construction includes a first backing sheet; a first layer of adhesive on said backing sheet; and a first layer of material. The first layer of material includes a front surface and a back surface, the back surface of the first layer of material contacting and covering the first layer of adhesive; a first outer peripheral edge; a first die cut area lying within the first outer peripheral edge; a plurality of symbols formed on the front surface of the first layer of material in the first die cut area; and, a first edge portion intermediate the first outer peripheral edge and the first die cut area and releasably attached to a portion of the first layer of adhesive for removal to expose the portion of the first layer of adhesive.

The laminate tag construction is separably attached to the laminate label construction and includes a second backing sheet; a second layer of adhesive on the backing sheet; and, a second layer of material. The second layer of material includes a front surface and a back surface, the back surface of the second layer of material contacting and covering the second layer of adhesive; a second outer peripheral edge; a plurality of symbols on the second front surface in the second die cut area and corresponding to the plurality of symbols on the first front surface of the first die cut area.

In still a further embodiment of the invention, I provide a method for correlating a key for a vehicle with the vehicle. The vehicle includes a window. The improved method includes the step of providing a business form for disassembly and manipulation to produce a label to be adhesively attached to an object, and to produce a tag to be attached to an article associated with the objects such that the article freely moves in at least one direction with respect to the tag. The business form includes a laminate label construction and a laminate tag construction.

The laminate label construction includes a first backing sheet; a first layer of adhesive on the backing sheet; and a first layer of material. The first layer of material includes a front surface and a back surface, the back surface of the first layer of material contacting and covering the first layer of adhesive; a first outer peripheral edge; a first die cut area lying within the first outer peripheral edge; a plurality of symbols formed on the front surface of the first layer of material in the first die cut area; and, a first edge portion intermediate the first outer peripheral edge and the first die cut area and releasably attached to a portion of the first layer of adhesive for removal to expose the portion of the first layer of adhesive.

The laminate tag construction is separably attached to the laminate label construction and includes a second backing sheet; a second layer of adhesive on the backing sheet; and, a second layer of material. The second layer of material includes a front surface and a back surface, the back surface of the second layer of material contacting and covering the second layer of adhesive; a second outer peripheral edge; and, a plurality of symbols formed on the second front surface in the second die cut area and corresponding to the plurality of symbols on the first front surface of the first die cut area.

The method also includes the steps of disassembling and manipulating the business form to produce the label by separating the laminate label construction from the business form and by peeling the first edge portion off the first layer to expose the portion of the first layer of adhesive; pressing the portion of the first layer of adhesive against the window of the vehicle; disassembling the business form to produce the tag by separating the laminate tag construction from the business form; and, attaching the vehicle key to the laminate tag construction.

In yet still a further embodiment of the invention, I provide a method for correlating a key for a vehicle with the vehicle. The vehicle includes a window. The method includes the step of making a business form for disassembly and manipulation to produce a label to be adhesively attached to an object and to produce a tag to be attached to an article associated with the object such that the article freely moves in at least one direction with respect to the tag. Making the business form includes the steps of providing a primary backing sheet having a front surface and a back surface and a peripheral edge, the backing sheet being fabricated from a pliable, transparent, thin polymer material, of applying a primary layer of adhesive to the front surface of the primary backing sheet, of providing a primary layer of material having a front surface and a back surface, of applying the back surface of the primary layer of material to the adhesive to secure the primary layer of material to the backing material; of forming symbols on said front surface of said primary layer of material; and, of forming lines of weakening in the backing sheet and the primary layer of material. The manufactured business form includes a label construction and a tag construction. The label construction includes a first backing sheet; a first layer of adhesive on the backing sheet; and a first layer of material. The first layer of material includes a front surface and a back surface, the back surface of the first layer of material contacting and covering the first layer of adhesive; a first outer peripheral edge; a first die cut area lying within the first outer peripheral edge; a plurality of symbols formed on the front surface of the first layer of material in the first die cut area; and, a first edge portion intermediate the first outer peripheral edge and the first die cut area and releasably attached to a portion of the first layer of adhesive for removal to expose the portion of the first layer of adhesive.

The tag construction is separably attached to the label form and includes a second backing sheet; a second layer of adhesive on the backing sheet; and, a second layer of material. The second layer of material includes a front surface and a back surface, the back surface of the second layer of material contacting and covering the second layer of adhesive; a second outer peripheral edge; a second die cut area lying within the second outer peripheral edge; a plurality of symbols characters formed on the second front surface in the second die cut area and corresponding to the plurality of symbols on the first front surface of the first die cut area; and, an edge portion intermediate the outer peripheral edge and the second die cut area and releasably attached to a portion of the second layer of adhesive for removal to expose the portion of the second layer of adhesive such that a portion of the second backing sheet can be folded over the second die cut area such that the portion of the second layer of adhesive contacts the second die cut area and secures the portion of the second backing sheet to the die cut area.

The method also includes the steps of disassembling and manipulating the business form to produce the label by separating the laminate label construction from the business form and by peeling the first edge portion off the first layer to expose the portion of the first layer of adhesive; pressing the portion of the first layer of adhesive against the window of the vehicle; disassembling the business form to produce the tag by separating the laminate tag construction from the business form; and, attaching the vehicle key to the laminate tag construction.

Turning now to the drawings, which depict the presently preferred embodiments of the invention for purpose of illustrating the invention and not by way of limitation of the scope of the invention, and in which like reference characters refer to corresponding elements throughout the several views, FIGS. 1 to 5 illustrate a business form constructed in accordance with the principles and method of the invention.

Figure 1:
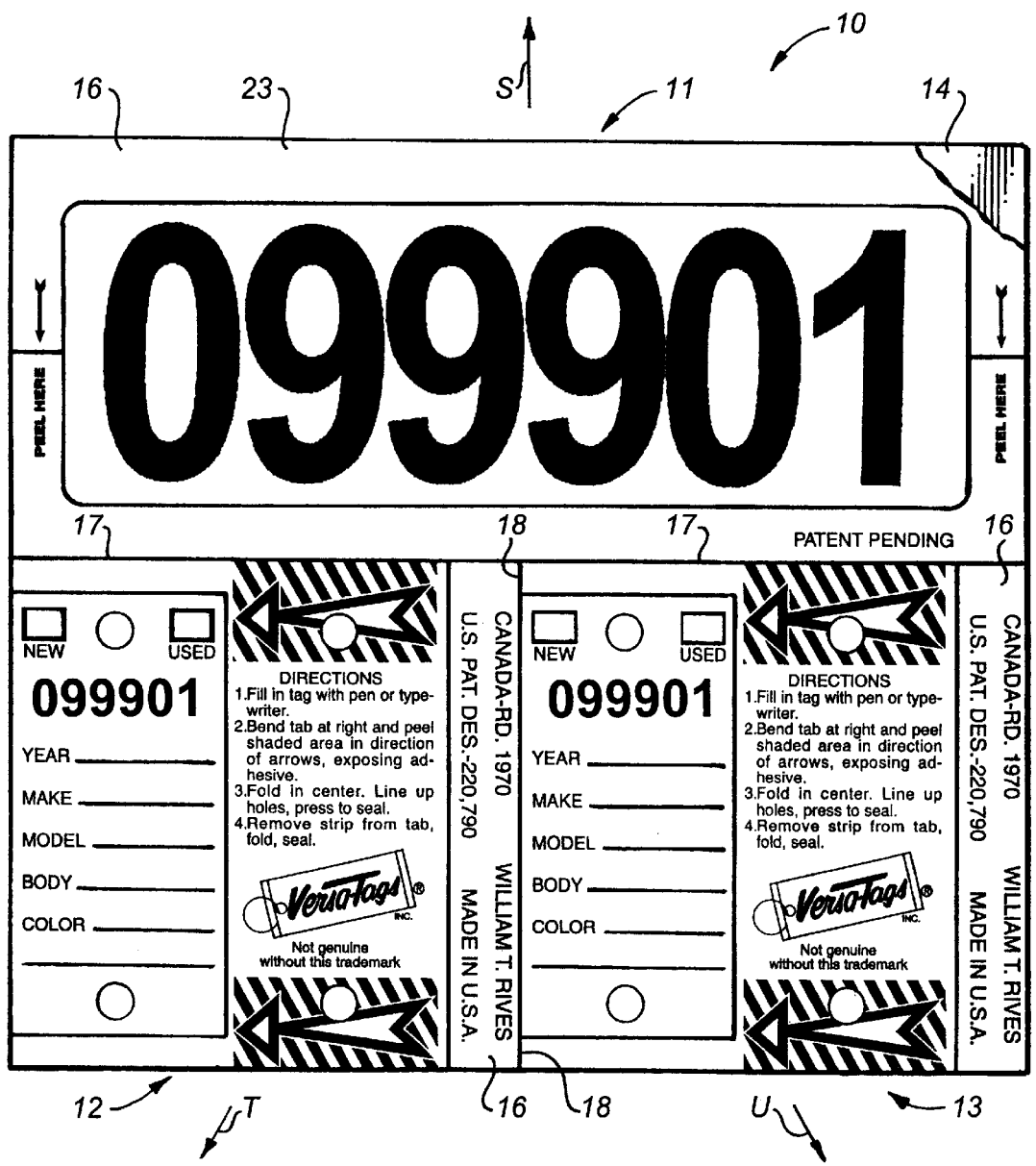
FIG. 1 illustrates a business form constructed in accordance with the principles of the invention.
Figure 2:
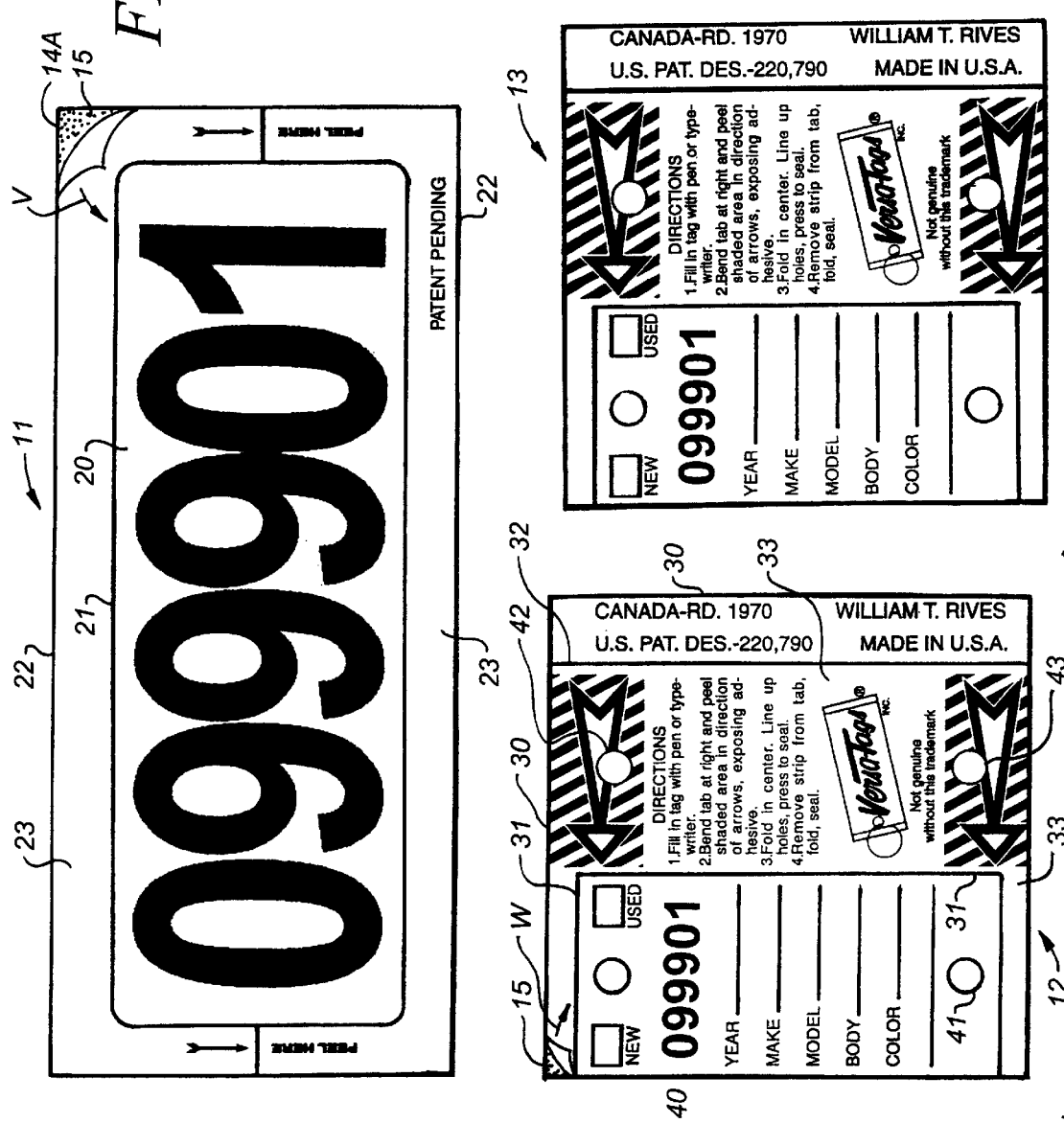
FIG. 2 illustrates the mode of operation of the business form of the invention.

In FIG. 1, the business form of the invention is generally indicated by reference character 10 and includes a laminate label construction 11 at the top and a pair of laminate tag constructions 12, 13 at the bottom. Business form 10 includes a transparent backing sheet 14, a layer of adhesive 15 (not visible in FIG. 1) coextensive with transparent sheet 14, and a layer of sheet material 16 which is coextensive with sheet 14 and contacts and covers the layer of adhesive 15. Business form 10 is die cut substantially through along horizontal line 17 and vertical line 18 in FIG. 1 such that label construction 11 and tag constructions 12 and 13 can be pulled apart along lines 17 and 18 in the directions indicated by arrows S, T, U to the orientation shown in FIG. 2 to disassemble form 10. In FIG. 2, label construction 11 is completely separated from tag constructions 12 and 13. Tag construction 13 is completely separated from label construction 11 and tag construction 12. Consequently, each construction 11 to 13 includes a portion of backing sheet 14, of adhesive layer 15, and of layer of material 16.

A variety of alphanumeric characters and/or other symbols (i.e., bar code lines or bars, dashes and dots, stars, cones, or any other symbols) are imprinted or otherwise formed on the front surface of the layer of sheet material 16. The back surface of layer 16 removably contacts the layer of adhesive 15. Layer 16 can be peeled off adhesive 15 and backing sheet 14. The adhesive layer 15 is between layer 16 and backing sheet 14.

The numeric characters "099901" are common to and are imprinted on each of constructions 11 to 13. Any desired alphanumeric character or characters or any other desired symbol(s) can be imprinted on and be common to each of constructions 11 to 13 in the same manner that the number "099901" is imprinted in FIGS. 1 to 5 on each of constructions 11 to 13. The use of the number "099901" on each of constructions 11 to 13 makes these constructions related.

Constructions 11 to 13 need not initially be attached to one another, but can be produced separately in any desired fashion. It is, however, presently preferred that (1) a business form 10 include each related label construction 11 and tag construction 12, 13, (2) adhesive layer 15 be applied to the front surface of backing sheet 14, and (3) the back surface of layer 16 be applied to and contact adhesive layer 15 to form a "three layer" laminate including the backing sheet 14, adhesive layer 15, and layer of material 16. After this "three layer" laminate is formed, the front surface of layer 16 be imprinted with alphanumeric characters and/or other symbols (layer 16 can, if desired, be imprinted prior to being applied to adhesive layer 15), and, the sheet 14, adhesive layer 15, and backing sheet 14 are die cut (or lines of weakening are otherwise formed) to facilitate the disassembly, manipulation, and use of each of constructions 11 to 13 from this multiple layer business form 10 in the manner illustrated in FIGS. 2 to 5.

In FIG. 2, constructions 11 to 13 have, as earlier described, been pulled apart from one another to disassemble business form 10.

Label construction 11 includes portion 14A of backing sheet 14. Numerals "099901" are imprinted on die cut area 20 of construction 11. Area 20 is circumscribed by die cut line 21. Edge portion 23 of layer 16 extends between the die cut area 20 and the rectangular peripheral edge 22 of laminate label construction 11. Edge portion 23 is peeled off adhesive 15 in the direction indicated by arrow V to expose the portion of adhesive which is on backing sheet 14 between area 20 and peripheral edge 22. Die cut area 20 remains on adhesive 15 and sheet 14 in the position illustrated in FIG. 2.

Label construction 11 is illustrated in FIG. 3 after portion 23 has been peeled off to expose a strip of adhesive 15 extending around die cut area 20.

After construction 11 is manipulated by peeling off portion 23 to expose adhesive 15, label construction 11 is pressed against the inside of a window in a selected vehicle such that the exposed portions of adhesive 15 contact the inside of the window and such that area 20 contacts the inside of the window and a person standing outside the vehicle can see the numerals "099901" through the window. Consequently, the numerals "099901" identify the vehicle.

In the preferred method of the invention, a plurality of business forms 10 are prepared. Each business form 10 includes constructions 11 to 13 which each bear the same sequence of numerals or other symbols. However, the sequence of numerals utilized on any given business form 10 is different from the sequence of numerals appearing on any of the other business forms 10. For example, a second business form 10 would be identical to that illustrated in FIGS. 1 to 5, except that the numeral sequence appearing on each of constructions 11 to 13 in the second business form, would be "099902", and not "099901". Each vehicle in the lot of an automobile dealership would then, for example, have a label construction 11 adhered to the inside of a window in the vehicle. However, the numeral sequence on each label construction 11 in a vehicle would be different from the numeral sequence appearing on any of the other label constructions 11 in any of the other vehicles offered for sale by the dealership. Each vehicle in the parking lot of the automobile dealership would be uniquely identified by a different numeral sequence on a label construction in the vehicle. One vehicle would be identified by a label construction 11 bearing the numeral sequence "099901", the next vehicle would be identified by a label construction 11 bearing the numeral sequence "099902", the next by a label construction 11 bearing the sequence "099903", etc. Each label construction 11 would have one or more associated tag constructions 12 and 13 bearing a numeral sequence identical to that on the label construction 11.

Tag constructions 12 and 13 are identical. The use of tag construction 12 will be described with the understanding that tag construction 13 is utilized in the same manner.

Before or after tag construction 12 is detached from business form 10, a pen, pencil, typewriter, or other means is used to enter the desired marks or information on portion 34 (1) in the "new" square, (2) in the "used" square, (3) on the line after "YEAR", (4) on the line after "MAKE", (5) on the line after "MODEL", (6) on the line after "BODY", and/or (7) on the line after "COLOR".

Tag construction 12 includes square outer peripheral edge 30. U-shaped die cut line 31 extends through layer 16, but not through portion 14B of backing 14. Similarly, vertical die-cut line 32 extends through layer 16, but not through portion 14B of backing 14. Circular apertures 40 to 43 each extend completely through tag construction 12 and through the portions of layer 16, adhesive layer 15, and the portion 14B of backing sheet 14 comprising tag construction 12.

Die cut lines 31 and 32 bound in part U-shaped portion 33 of layer 16. Tag construction 12 is manipulated by peeling off portion 33 in the manner indicated in FIG. 2 by arrow W to expose a portion of adhesive 15. Tag construction 12 is illustrated in FIG. 3 after portion 33 has been peeled off and discarded to expose the adhesive 15 intermediate rectangular portions 34 and 35 of layer 16. Portions 34 and 35 remain affixed to adhesive 15 and to portion 14B in the positions illustrated in FIGS. 2 and 3.

The section 36 of portion 14B to the right of the vertical edge 31A (hereafter called the "cover section" 36) of portion 34 is then manipulated and folded in the direction of arrow X in FIG. 3 over portion 34 to the position illustrated in FIG. 4 so that adhesive 15 on the cover section 36 contacts portion 34 and secures the cover section 36 of portion 14B in place on portion 34. Since cover section 36 comprises a portion of backing sheet 14 and is transparent, the alphanumeric characters "099901" and other characters and symbols on portion 34 are visible through cover section 36 in FIG. 4. In order to facilitate the folding of cover section 36 over portion 34 in the manner just described, backing sheet 14 is relatively thin and has a thickness in the range of 0.25 mil to 8 mils, preferably about 1 mil to 5 mils. Backing sheet 14, or at least the portion 36 of sheet 14, is transparent. Sheet 14 must also be pliable to facilitate folding portion 36 over portion 34. Adhesive layer 15 and sheet 14 are important because they significantly increase the strength of portion 34, especially after portions of sheet 14 are folded around portion 34 to produce the tag construction 12 illustrated in FIG. 5.

When cover section 36 is folded over portion 34 to the position illustrated in FIG. 4, aperture 42 aligns with and is in registration with aperture 40; and, aperture 43 aligns with and is in registration with aperture 41. The back surface 50 of the portion 14B of backing sheet 14 comprising tag construction 12 is visible in FIG. 4.

After cover section 36 is folded to the position illustrated in FIG. 4, tag construction 12 is further manipulated by peeling portion 35 off portion 14B, and folding the resulting strip 52 around behind portion 34 in the manner indicated by arrows D and E in FIGS. 4 and 5 so that adhesive 15 on strip 52 is pressed against an area of portion 14B which is, in FIG. 5, behind portion 34. After strip 52 is pressed against portion 14B in this manner, portion 34 is completely encased, sealed, and covered by portion 14B. When backing 14 is, as presently preferred, comprised of a pliable, foldable, waterproof, transparent plastic, portion 14B then functions to protect portion 34. Layer 16 presently comprises paper or cardboard stock to facilitate writing, imprinting, or otherwise forming alphanumeric characters or other symbols on portion 34. The materials utilized to make layers 14, 15, 16 can vary as desired.

A key ring(s) 61 and key(s) 60 can be attached to tag construction 12 in FIG. 5 through aperture pair 43-41 or 42-40 in the manner suggested by the key 60 and key ring 61 illustrated on tag construction 13 in FIG. 5. Key ring 61 enables key 60 to move at least a short distance in all or nearly all directions with respect to tag construction 12. Ring 61, or other fastening means used in combination with tag construction 12, should enable key 60 to move freely at least a short distance in at least one direction.

Since the numeral string "099901" on tag construction 12 (or 13) corresponds with the numeral string "099901" on area 20, matching a key 60 to the correct vehicle is a simple matter. If the vehicle has a label construction 11 secured to the inside of a vehicle window in the manner earlier described, and if the numeral string "099901" on area 20 of label construction 11 corresponds to the numeral string "099901" on tag construction 12, then a vehicle sales person knows that the key(s) on tag construction 12 is the correct key for the vehicle.

In use, each business form 10 is made by obtaining a backing sheet 14, adhesive 15, and layer of material 16. Symbols are imprinted on layer of material 16 before or after form 10 is made. Form 10 is made by applying a thin layer of adhesive 15 to backing sheet 14 and by then applying layer of material 16 to adhesive 15 to secure layer of material 16 to backing sheet 14 in registration with sheet 14. If desired, the numerals "099901" or other symbols common to each construction 11, 12, 13 of a form 10 need not be imprinted on form 10 during construction of form 10.

Instead, form 10 can be produced "in blank" and the numerals or other symbols can be handwritten, imprinted, or otherwise formed on form 10 by a vehicle dealership after the dealership has received the form 10.

Business form 10 is disassembled and manipulated in the manner described above to produce the label construction 11 shown in FIG. 3 and the label constructions 12, 13 illustrated in FIG. 5. The key(s) 60 are obtained for a vehicle. The label construction 11 is placed on the inside of a window in the vehicle and the key(s) for the vehicle are attached to a tag construction 12, 13. The numeral sequence 70 ("099901") on the label construction 11 corresponds to the numeral sequence 71, 72 on the tag constructions 12, 13. A business form 10 is utilized in this fashion with each vehicle in the lot of a vehicle dealership to correlate the keys for the vehicle with the vehicle. Each business form 10 preferably has a numeral sequence 70 which is different from the numeral sequence on other business forms 10.

As used herein, an article is associated with an object if the article is necessary to use the object or if the article is intended to be used in conjunction with the object.

Having described my invention in such terms as to enable those skilled in the art to understand and practice it, and having identified the presently preferred embodiments thereof, I claim:

1. A business form for disassembly and manipulation to produce
   a label to be adhesively attached to an object, and
   a tag to be attached to an article associated with the object such that the article freely moves in at least one direction with respect to the tag, said form including
   (a) a laminate label construction for disassembly from the business form and manipulation into the label, said label construction separably attached to said business form and including
      (i) a first backing sheet;
      (ii) a first layer of adhesive on said backing sheet;
      (iii) a first layer of material including
         a front surface and a back surface, said back surface of said first layer of material contacting and covering said first layer of adhesive,
         a first outer peripheral edge,
         a first die cut area lying within said first outer peripheral edge,
         a plurality of symbols formed on said front surface of said first layer of material in said first die cut area,
         a first edge portion intermediate said first outer peripheral edge and said first die cut area and releasably attached to a portion of said first layer of adhesive for removal to expose said portion of said first layer of adhesive; and,
   (b) a laminate tag construction for disassembly from the business form and manipulation into the tag, said tag construction separably attached to said business form and including
      (i) a second transparent backing sheet,
      (ii) a second layer of adhesive on said backing sheet,
      (iii) a second layer of material including
         a front surface and a back surface, said back surface of said second layer of material contacting and covering said second layer of adhesive,
         a second outer peripheral edge,
         a second die cut area lying within said second outer peripheral edge,
         a plurality of symbols formed on said second front surface in said second die cut area and corresponding to said plurality of symbols on said first front surface of said first die cut area,
         an edge portion intermediate said outer peripheral edge and said second die cut area and releasably attached to a portion of said second layer of adhesive for removal to expose said portion of said second layer of adhesive such that a portion of said second backing sheet can be folded over said second die cut area such that said portion of said second layer of adhesive contacts said second die cut area and secures said portion of said second backing sheet to said die cut area.

2. A method of correlating a key for a vehicle with the vehicle, said vehicle including a window, said method including the steps of
   (a) providing a business form for disassembly and manipulation to produce
      (i) a label to be adhesively attached to an object, and
      (ii) a tag to be attached to an article associated with the object such that the article freely moves in at least one direction with respect to the tag, said form including
      (iii) a laminate label construction including
         a first backing sheet,
         a first layer of adhesive on said backing sheet,
         a first layer of material including
            front and back surfaces, said back surface of said first layer of material contacting and covering said second layer of adhesive,
            a first outer peripheral edge,
            a first die cut area lying within said first outer peripheral edge,
            a plurality of symbols formed on said front surface of said first layer in said first die cut area,
            a first edge portion intermediate said first outer peripheral edge and said first die cut area and releasably attached to a portion of said first layer of adhesive for removal to expose said portion of said first layer of adhesive;
      (iv) a laminate tag construction including
         a second transparent backing sheet,
         a second layer of adhesive on said backing sheet,
         second layer of material including
            a front and a back surface, said back surface of said second layer contacting and covering said second layer of adhesive,
            a second outer peripheral edge,
            a second die cut area lying within said second outer peripheral edge,
            a plurality of symbols formed on said front surface of said second layer in said second die cut area and corresponding to said plurality of symbols on said front surface of said second die cut area,
            a second edge portion intermediate said outer peripheral edge and said second die cut area and releasably attached to a portion of said second layer of adhesive for removal to expose said portion of said second layer of adhesive such that a transparent portion of said second backing sheet can be folded over said second die cut area such that said portion of said second layer of adhesive contacts said second die cut area and secures said portion of said second backing sheet to said second die cut area;

(c) disassembling and manipulating said business form to produce the label by
  (i) separating said laminate label construction from said business form,
  (ii) peeling said first edge portion off said first layer to expose said portion of said first layer of adhesive;
(d) pressing said portion of said first layer of adhesive against the window of the vehicle to secure the label to the window;
(e) disassembling and manipulating said business form to produce the tag by
  (i) separating said laminate tag construction from the business form,
  (ii) peeling said second edge portion off said second layer to expose said portion of said second layer of adhesive;
  (iii) folding said portion of said second backing sheet over said second die cut area to contact said portion of said second layer adhesive with said second die cut area to secure said transparent portion of said second backing sheet to said second die cut area; and,
(f) attaching the vehicle key to the tag.

3. A method of correlating a key for a vehicle with the vehicle, said vehicle including a window, said method including the steps of
(a) providing a business form for disassembly and manipulation to produce
  (i) a label to be adhesively attached to an object, and
  (ii) a tag to be attached to an article associated with the object such that the article freely moves in at least one direction with respect to the tag, said form including
  (iii) a laminate label construction including
    a first backing sheet,
    a first layer of adhesive on said backing sheet,
    a first layer of material including
      front and back surfaces, said back surface of said first layer of material contacting and covering said second layer of adhesive,
      a first outer peripheral edge,
      a first die cut area lying within said first outer peripheral edge,
      a plurality of symbols formed on said front surface of said first layer in said first die cut area,
      a first edge portion intermediate said first outer peripheral edge and said first die cut area and releasably attached to a portion of said first layer of adhesive for removal to expose said portion of said first layer of adhesive;
  (iv) a laminate tag construction including
    a second backing sheet,
    a second layer of adhesive on said backing sheet,
    a second layer of material including
      a front and a back surface, said back surface of said second layer contacting and covering said second layer of adhesive,
      a second outer peripheral edge,
      a plurality of symbols formed on said front surface of said second layer in said second die cut area and corresponding to said plurality of symbols on said front surface of said second die cut area;
(c) disassembling and manipulating said business form to produce the label by
  (i) separating said laminate label construction from said business form,
  (ii) peeling said first edge portion off said first layer to expose said portion of said first layer of adhesive;
(d) pressing said portion of said first layer of adhesive against the window of the vehicle to secure the label to the window;
(e) disassembling said business form to produce the tag by separating said laminate tag construction from the business form; and,
(f) attaching the vehicle key to the tag.

4. A method of correlating a key for a vehicle with the vehicle, said vehicle including a window, said method including the steps of
(a) making a business form for disassembly and manipulation to produce a label to be adhesively attached to an object and to produce a tag to be attached to an article associated with the object such that the article freely moves in at least one direction with respect to the tag, said business form being made by
  (i) providing a primary backing sheet having a front surface and a back surface and a peripheral edge, said sheet being fabricated from a pliable, transparent, thin polymer material,
  (ii) applying a primary layer of adhesive to said front surface of said primary backing sheet,
  (iii) providing a primary layer of material having a front surface and a back surface and substantially coextensive with said backing sheet,
  (iv) applying said back surface of said primary layer of material to said adhesive to secure said primary layer of material to said backing material such that said primary layer of material is substantially coextensive with said backing sheet,
  (v) forming symbols on said front surface of said primary layer of material, and
  (vi) forming lines of weakening in said backing sheet and said primary layer of material, such that said business form includes
    (A) a laminate label construction including
      a first backing sheet,
      a first layer of adhesive on said backing sheet,
      a first layer of material including
        front and back surfaces, said back surface of said first layer of material contacting and covering said second layer of adhesive,
        a first outer peripheral edge,
        a first die cut area lying within said first outer peripheral edge,
        a plurality of symbols formed on said front surface of said first layer in said first die cut area,
        a first edge portion intermediate said first outer peripheral edge and said first die cut area and releasably attached to a portion of said first layer of adhesive for removal to expose said portion of said first layer of adhesive;
    (B) a laminate tag construction including
      a second backing sheet,
      a second layer of adhesive on said backing sheet,
      a second layer of material including
        a front and a back surface, said back surface of said second layer contacting and covering said second layer of adhesive,
        a second outer peripheral edge,
        a second die cut area lying within said second outer peripheral edge,
        a plurality of symbols formed on said front surface of said second layer in said second die cut area and corresponding to said plurality of symbols on said front surface of said second die cut area, a second edge portion intermediate said outer peripheral edge and said second die cut area and releasably attached to a portion of said second layer of adhesive for removal to expose said portion of said second layer of adhesive such that a transparent portion of said second backing sheet can be folded over said second die cut area such that said portion of said second layer of adhesive contacts said second die cut area and secures said portion of said second backing sheet to said second die cut area;

(b) disassembling and manipulating said business form to produce the label by
 (i) separating said laminate label construction from said business form,
 (ii) peeling said first edge portion off said first layer to expose said portion of said first layer of adhesive;

(c) pressing said portion of said first layer of adhesive against the window of the vehicle to secure the label to the window;

(d) disassembling and manipulating said business form to produce the tag by
 (i) separating said laminate tag construction from the business form,
 (ii) peeling said second edge portion off said second layer to expose said portion of said second layer of adhesive;
 (iii) folding said portion of said second backing sheet over said second die cut area to contact said portion of said second layer adhesive with said second die cut area to secure said transparent portion of said second backing sheet to said second die cut area; and, (e) attaching the vehicle key to the tag.

* * * * *